ns of the United States Patent Office 3,531,478
Patented Sept. 29, 1970

3,531,478
METHINE DYES CONTAINING AN ISOINDOLO-
BENZIMIDAZOLIUM OR A BENZOPYRROLO-
PERIMIDINIUM NUCLEUS
Gether Irick, Jr., Kingsport, Tenn., assignor to Eastman
Kodak Company, Rochester, N.Y., a corporation of
New Jersey
No Drawing. Filed May 29, 1967, Ser. No. 642,238
Int. Cl. C09b 23/04, 23/10
U.S. Cl. 260—240                              13 Claims

ABSTRACT OF THE DISCLOSURE

Isoindolobenzimidazolium, benzopyrroloperimidinium compounds and methine dyes derived therefrom having utility as dyes for synthetic materials and as intermediates in the preparation thereof.

---

This invention relates to novel isoindolobenzimidazolium and benzopyrroloperimidinium compounds and to novel methine compounds and methine cations derived therefrom. In particular, the invention is directed to novel 5-substituted isoindolo(2,1-a)benzimidazolium cations, to novel 7-substituted benzo(3,4)pyrrolo(1,2-a)perimidinium cations and to the novel methine cations prepared therefrom.

The novel isoindolobenzimidazolium compounds and benzopyrroloperimidinium compounds are characterized, respectively, by the general Formulae I and II, below, while the novel methine compounds and cations are characterized by the general Formulae III and IV, below:

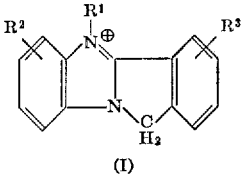

(I)

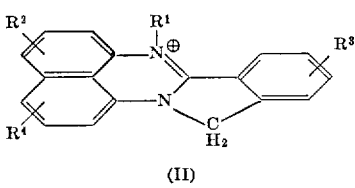

(II)

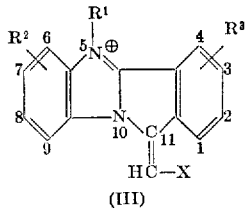

(III)

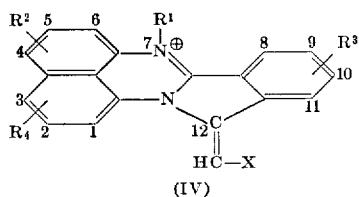

(IV)

wherein $R^1$ represents an alkyl group or an aralkyl group; $R^2$, $R^3$, and $R^4$ are the same or different and each represents hydrogen, an alkyl group or an alkoxy group; and X represents an aldehyde residue.

The cations represented by Formulae I and II are useful, as will be more fully explained hereinafter, for the preparation of the methine cations represented by Formulae III and IV. The methine cations of the invention are useful, as will similarly be more fully explained hereinafter, for dyeing acrylic and modacrylic fibers, yarns and fabrics colors which range from bright shades of orange to deep shades of blue. Illustrative textile materials which can be dyed with the methine cations include acrylic, modacrylic, acid-modified acrylic and sulfonate-modified polyester materials.

Typical of the alkyl groups represented by $R^1$ are the lower alkyl groups of up to about 4 carbon atoms such as methyl, ethyl, n-propyl and n-butyl. A typical aralkyl group represented by $R^1$ is the benzyl group.

Representative alkyl groups and alkoxy groups represented by $R^2$, $R^3$, and $R^4$ are the lower alkyl groups having up to about 4 carbon atoms, such as methyl, ethyl, n-propyl, n-butyl and the lower alkoxy groups such as methoxy, ethoxy, etc.

The aldehyde residues represented by X are characterized by the formulae

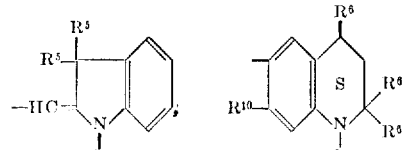

and

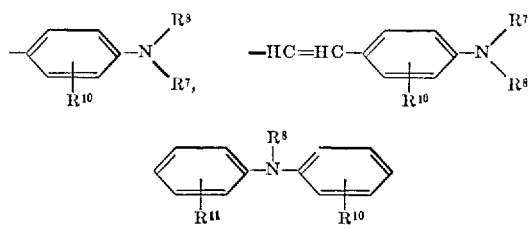

wherein $R^5$ represents lower alkyl, each $R^6$ represents hydrogen or lower alkyl and $R^7$, $R^8$ and $R^9$ are the same or different and each represents hydrogen, a lower alkyl group, e.g. methyl, ethyl, n-propyl or a substituted alkyl group such as an alkoxyalkyl group, e.g. 2-methoxyethyl, a cyanoalkyl group, e.g. 2-cyanoethyl, a carboxylic acid imidoalkyl group, e.g. 2-succinimidoethyl or a haloalkyl group, e.g. 2-chloroethyl, 2-bromoethyl, etc.

$R^{10}$ and $R^{11}$ are the same or different and each represents hydrogen, a lower alkyl group, e.g. methyl, ethyl, an alkoxy group, e.g. methoxy, ethoxy, or halogen, e.g. bromo, chloro. Where $R^{10}$ or $R^{11}$ represent substituents such as hydrogen or a lower alkyl group, such substituents can be the same or different than the corresponding substituents constituting $R^7$, $R^8$ and $R^9$.

In a particularly preferred group of the novel compounds of the invention represented by general Formulae I, II, III and IV, $R^1$ represents methyl, $R^2$, $R^3$, and $R^4$ represent hydrogen and X represents aldehyde residues, as described above, wherein $R^5$ represents methyl, each $R^6$ represents hydrogen or methyl, $R^7$, $R^8$ and $R^9$ are the same or different and each represents hydrogen, methyl, ethyl or cyanoethyl and $R^{10}$ and $R^{11}$ represent hydrogen, methyl, methoxy, ethoxy, or chloro.

The novel cations of the invention are prepared, in the case of the cations of Formula I by the reaction of phthalide or an appropriately substituted derivative thereof with o-phenylenediamine hydrochloride or an appropriately substituted derivative thereof to give isoindolo (2,1-a)benzimidazolium chloride and treatment of such salt with a base to give the isoindolobenzimidazole which is unsubstituted in the 5-position as described by Bistrzycki et al., Annalen 415, 1 (1917). Quaternization of the unsubstituted isoindolobenzimidazole with a suitable quaternizing agent, such as an alkyl halide, e.g. methyl iodide, an aralkyl halide, e.g. benzyl chloride, or a dialkyl sulfate, e.g. dimethyl sulfate, etc., produces the novel 5-substituted compounds of Formula I.

In the case of the cations of Formula II, the benzo(3,4)pyrrolo(1,2-a)perimidine which is unsubstituted in the 5-position is prepared, as described above by Bistrzycki et al., by the reaction of an appropriate phthalide and an appropriate 1,8-naphthalenediamine hydrochloride to give a benzo(3,4)pyrrolo(1,2-a)perimidinium hydrochloride. Subsequent treatment thereof with base yields the benzopyrroloperimidine which is unsubstituted in the 7-position. Quaternization as set forth above, gives the novel 7-substituted cations of Formula II.

Upon condensation of the novel cations of Formulae I and II with an appropriate aldehyde, in the presence of acetic anhydride, the novel methine cations of Formulae III and IV are obtained.

The aldehyde compounds which are condensed with the cations of Formulae I and II to obtain the methine compounds and methine cations of Formulae III and IV are commercially available and/or are prepared by well known procedures. Thus, the aldehydes are selected from the following types:

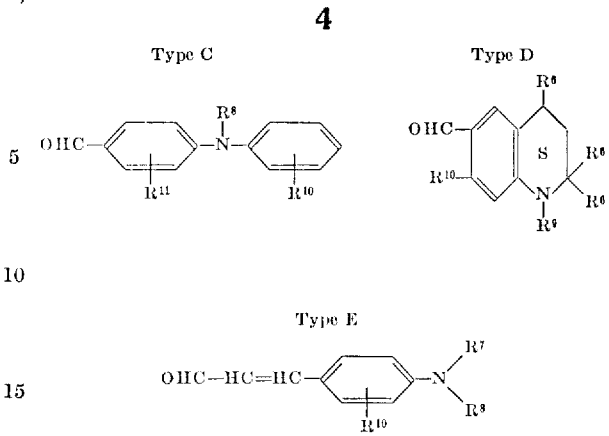

It has thus been found that reaction of the unsubstituted isoindolobenzimidazole and benzopyrroloperimidine compounds with quaternizing agents will produce the previously unknown quaternary 5-substituted isoindolobenzimidazolium and 7-substituted benzopyrroloperimidinium cations of the invention. Further, it has been found that the quaternary nitrogen atom activates the methylene group in the 11-position of the compounds of Formula I and the corresponding methylene group in the 12-position of the cations of Formula II whereby such will readily condense with the above-described aldehydes to yield the novel methine cations represented by Formulae II and IV.

The following series of reactions illustrates a convenient mode of preparing the cations of the invention.

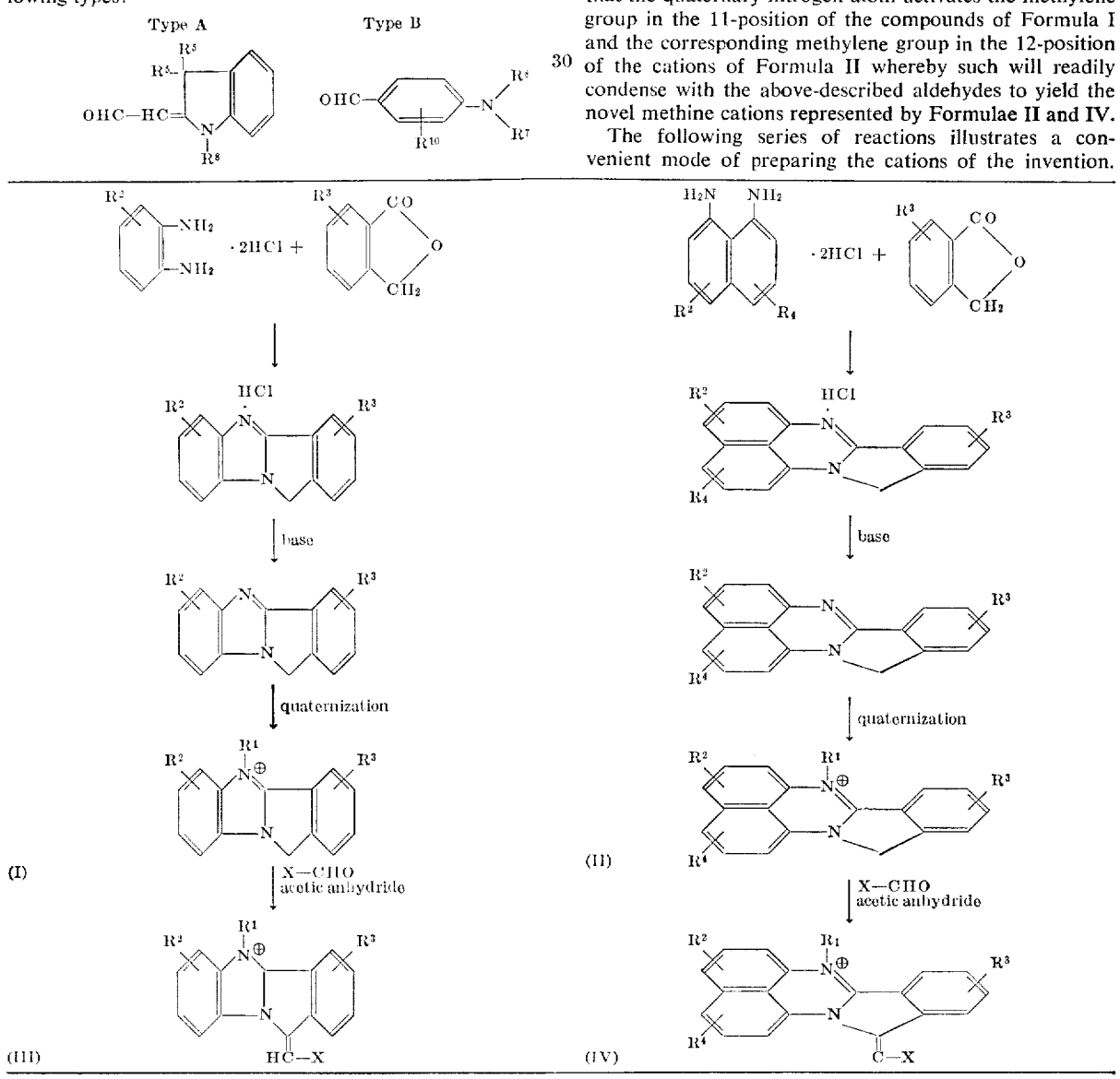

In addition to o-phenylenediamine (i.e. 1,2-diaminobenzene), the following substituted derivatives thereof are used to prepare the novel cations of Formulae I and III of the invention: 3-methyl-1,2-diaminobenzene, 4-methyl-1,2-diaminobenzene, 3 - ethyl - 1,2 - diaminobenzene, 4 - ethyl - 1,2 - diaminobenzene, 3-n-propyl-1,2-diaminobenzene, 4-n-propyl - 1,2 - diaminobenzene, 3-n-butyl - 1,2 - diaminobenzene, 4-n-butyl - 1,2 - diaminobenzene, 3 - methoxy - 1,2 - diaminobenzene, 4-methoxy-1,2 - diaminobenzene, 3 - ethoxy - 1,2 - diaminobenzene, 4 - ethoxy - 1,2 - diaminobenzene, etc. Particularly preferred are 1,2-diaminobenzene and those derivatives thereof containing a methyl group in positions 3 or 4.

The phthalide reactants utilized in preparing the cations of Formulae I, II, III, and IV of the invention include phthalide (i.e. 1-phthalanone) and the following substituted derivatives thereof: 3-methyl-1-phthalanone, 4-methyl-1-phthalanone, 5-methyl-1-phthalanone, 6-methyl-1-phthalanone, 3-ethyl-1-phthalanone, 4-ethyl-1-phathalanone, 5 - ethyl - 1 - phthalanone, 6-ethyl-1-phthalanone, 3-n-propyl-1-phthalanone, 4-n-propyl - 1 - phthalanone, 5 - n - propyl-1-phthalanone, 6-n-propyl-1-phthalanone, 3-n-butyl - 1 - phthalanone, 4-n-butyl-1-phthalanone, 5-n-butyl - 1 - phthalanone, 6-n-butyl-1-phthalanone, 3-methoxy-1-phthalanone, 4-methoxy-1-phthalanone, 5-methoxy-1-phthalanone, 6 - methoxy-1-phthalanone, 3-ethoxy - 1-phthalanone, 4 - ethoxy - 1 - phthalanone, 5 - ethoxy-1-phthalanone, 6 - ethoxy - 1 - phthalanone, etc. Preferred compounds are 1 - phthalanone and derivatives thereof containing a methyl group in positions 3, 4, 5 or 6.

In addition to 1,8-naphthalenediamine, the following derivatives thereof are utilized in preparing the cations of Formulae II and IV: 2,7 - dimethyl-1,8-naphthalenediamine, 3 - methyl-1,8 - naphthalenediamine, 3,6-dimethyl-1,8 - naphthalenediamine, 5 - methyl - 1,8-naphthalenediamine, 4,5 - dimethyl - 1,8 - naphthalenediamine, 2,7-diethyl - 1,8 - naphthalenediamine, 3 - ethyl-1,8-naphthalenediamine, 3,6 - diethyl - 1,8 - naphthalenediamine, 5-ethyl - 1,8 - naphthalenediamine, 4,5 - diethyl - 1,8-naphthalenediamine, 2,7 - di - n - propyl - 1,8 - naphthalenediamine, 3,6 - di - n - propyl-1,8-naphthalenediamine, 4-n-propyl-1,8-naphthalenediamine, 4,5 - di - n - propyl-1,8 - naphthalenediamine, 6-n-propyl - 1,8 - naphthalenediamine, 2,7 - di - n - butyl - 1,8-naphthalenediamine, 3-n-butyl-1,8-naphthalenediamine, 3,6 - di-n-butyl - 1,8-naphthalenediamine, 6-n-butyl - 1,8-naphthalenediamine, 4,5 - di - n-butyl-1,8-naphthalenediamine, 2,7-dimethoxy-1,8 - naphthalenediamine, 3,6 - dimethoxy - 1,8-naphthalenediamine, 4 - methoxy - 1,8 - naphthalenediamine, 4,5-dimethoxy - 1,8 - naphthalenediamine, 6 - methoxy - 1,8-naphthalenediamine, 2,7 - diethoxy - 1,8 - naphthalenediamine, 3 - ethoxy - 1,8 - naphthalenediamine, 3,6 - diethoxy 1,8 - naphthalenediamine, 5-ethoxy-1,8-naphthaenediamine, etc. Preferred compounds include 1,8-naphlenediamine, 4, 5-diethoxy-1,8-naphthalenediamine, etc. Preferred compounds include 1,8 - naphthalenediamine and derivatives thereof containing at least one methyl group in positions 2, 3 or 4.

Representative isoindolobenzimidazoles and benzopyrroloperimidines which are utilized in accordance with the invention are 5-methylisoindolo(2,1-a)benzimidazole,
5-ethylisoindolo(2,1-a)benzimidazole,
5-benzylbenzoisoindolo(2,1-a)benzimidazole,
3,5-dimethylisoindolo(2,1-a)benzimidazole,
5,8-dimethylisoindolo(2,1-a)benzimidazole,
3-n-butyl-5-methylisoindolo(2,1-a)benzimidazole,
2,5,8-trimethylisoindolo(2,1-a)benzimidazole,
2-n-propyl-5,8-dimethylisoindolo(2,1-a)benzimidazole,
3-methoxy-5-methylisoindolo(2,1-a)benzimidazole,
7-ethoxy-3,5-dimethylisoindolo(2,1-a)benzimidazole,
3-methyl-5-ethylisoindolo(2,1-a)benzimidazole,
8-n-propyl-5-methylisoindolo(2,1-a)benzimidazole,
2,8-dimethyl-5-benzylisoindolo(2,1-a)benzimidazole,
7-n-butyl-5-methylisoindolo(2,1-a)benzimidazole,
7-methylbenzo(3,4)pyrrolo(1,2-a)perimidine,
3,7,9-trimethylbenzo(3,4)pyrrolo(1,2-a)perimidine,
2,4,7,10-tetramethylbenzo(3,4)pyrrolo(1,2-a)perimidine,
7,9-dimethylbenzo(3,4)pyrrolo(1,2-a)perimidine,
2,7-dimethyl-11-methoxybenzo(3,4)pyrrolo(1,2-a)perimidine,
2,5-dimethyl-7-benzylbenzo(3,4)pyrrolo(1,2-a)perimidine, etc.

Preferred compounds are 5-methylisoindolo(2,1-a)benzimidazole and
7-methylbenzo(3,4)pyrrolo(1,2-a)perimidine.

Representative aldehydes utilized in accordance with the invention include 1,3,3-trimethyl-2-methylene-omega-formylindoline,
1-chloroethyl-3,3-dimethyl-2-methylene-omega-formylindoline,
1,3,3-triethyl-2-methylene-omega-formylindoline,
1-cyanoethyl-3,3-dimethyl-2-methylene-omega-formylindoline,
1-methyl-3,3-diethyl-2-methylene-omega-formylindoline,
4-(N-ethyl-N-$\beta$-cyanoethyl)-2-methylbenzaldehyde,
4-(N-ethyl-N-$\beta$-methoxyethyl)-2-methylbenzaldehyde,
4-(N-cyanoethyl-N-$\beta$-chloroethyl)-2-methylbenzaldehyde,
4-(N-cyanoethyl-N-$\beta$-ethyl)-2-methylbenzaldehyde,
4-(N,N-dichloroethyl)-2-methylbenzaldehyde,
4-(N-chloroethyl-N-$\beta$-ethyl)-2-methylbenzaldehyde,
4-(N-propyl-N-$\beta$-cyanoethyl)-2-methylbenzaldehyde,
4-(N-ethyl-N-$\beta$-succinimidoethyl)-2-methylbenzaldehyde,
N-methyl-4'-ethoxy-4-formyldiphenylamine,
N-chloroethyl-4-formyldiphenylamine,
N-methyl-4-formyldiphenylamine,
N-ethyl-4'-methoxy-4-formyldiphenylamine,
N-cyanoethyl-4'-ethoxy-4-formyldiphenylamine,
N-ethyl-4'-ethoxy-4-formyldiphenylamine,
2,7-dimethyl-N-cyanoethyl-6-formyl-1,2,3,4-tetrahydroquinoline,
2,7-dimethyl-N-ethyl-6-formyl-1,2,3,4-tetrahydroquinoline,
2-methyl-7-ethyl-N-cyanoethyl-6-formyl-1,2,3,4-tetrahydroquinoline,
2-methyl-7-ethyl-N-chloroethyl-6-formyl-1,2,3,4-tetrahydroquinoline,
p-dimethylaminocinnamaldehyde,
p-(N-ethyl-N-$\beta$-chloroethyl)aminocinnamaldehyde,
p-(N-ethyl-N-$\beta$-cyanoethyl)aminocinnamaldehyde,
p-(N-chloroethyl-N-$\beta$-cyanoethyl)aminocinnamaldehyde,
o-methyl-p-(N-cyanoethyl-N-$\beta$-ethyl)aminocinnamaldehyde, etc.

The novel methine cations of the invention, of course, exist in combination with an anion such as, for example, $Cl^-$, $Br^-$, $I^-$, $CH_3SO_4^-$, $C_6H_5SO_3^-$, etc., the anion depending on the method of preparation utilized and the particular quaternizing agent employed. The anion does not affect the utility of the methine cations of the invention as dyes nor does it affect the dye affinity of the cations for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the dyebath or in a subsequent washing of the dyed polyacrylonitrile textile material. Since the cation of a cationic methine dye is responsible for the color of the compound and the particular anion associated with the cation is not important, the novel methine cations of the invention are described herein without being associated with an anion.

Suitable quaternizing agents which can be used in preparing the novel methine cations of the invention are the dialkyl sulfates, the alkyl halides, the aralkyl halides, the alkyl esters of sulfonic acids, etc. Specific quaternizing agents include, for example, dimethyl sulfate, diethyl sulfate, dipropyl sulfate, dibutyl sulfate, ethyl bromide, methyl iodide, ethyl iodide, n-butyl iodide, benzyl chloride, benzyl bromide, methyl-p-toluene sulfonate, butyl-p-toluene sulfonate and ethyl benzene sulfonate.

The following examples will serve to further describe and illustrate the invention.

EXAMPLE 1

Isoindolo(2,1-a)benzimidoazolium chloride

A mixture of 23 g. o-phenylene diamine, 23 ml. concentrated hydrochloric acid and 100 ml. of methanol is stirred for 5 minutes and evaporated to dryness to give o-phenylenediamine hydrochloride which is then mixed with 28.6 g. of phthalide and heated to 200°. After 45 minutes the mixture is cooled, slurried in cold water and filtered to give isoindolo(2,1-a)benzimidazolium chloride.

EXAMPLE 2

Isoindolo(2,1-a)benzimidazole

The hydrochloride salt from Example 1 is suspended in 800 ml. of water and made basic by addition of ammonium hydroxide. Filtration and water washing gives the crude product. Recrystallization from ethanol and from toluene gives the nearly colorless crystalline isoindolo-(2,1-a)benzimidazole. It has the structure:

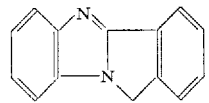

EXAMPLE 3

A solution of 3.09 g. isoindolo(2,1-a)benzimidazole, 2.50 g. methyl iodide and 100 ml. of ethanol is refluxed for 5 hours on a steam bath. Cooling to −15° C. precipitates the product which is isolated by filtration. Recrystallization from water gives the analytically pure 5-methylisoindolo(2,1-a)benzimidazolium iodide which melts with evolution of gas at 250–300°. It has the structure:

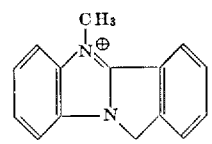

In accordance with the above procedure, the 5-substituted isoindolo(2,1-a)benzimidazoles of Table I are prepared:

TABLE I

| Example No. | R¹ | R² | R³ |
|---|---|---|---|
| 4 | ethyl | H | H |
| 5 | methyl | H | 3-methoxy |
| 6 | benzyl | H | H |
| 7 | methyl | H | 3-methyl |
| 8 | methyl | 6-methyl | H |
| 9 | methyl | 8-methyl | 3-methyl |
| 10 | ethyl | H | 3-methyl |
| 11 | benzyl | 8-methyl | 4-methyl |
| 12 | methyl | 7-n-propyl | H |
| 13 | methyl | 6-n-butyl | H |
| 14 | methyl | 9-methyl | 2-n-propyl |
| 15 | methyl | H | 3-n-butyl |
| 16 | methyl | 8-ethoxy | 3-methyl |

EXAMPLE 17

A mixture of 6.2 g. isoindolo(2,1-a)benzimidazole and 30 ml. of dimethyl sulfate is heated to solution at reflux, cooled and held at 100° for ½ hour, during which time crystallization occurs: The mixture is poured into 400 ml. of dry ether, filtered and the solids are ether washed and dried for a few minutes at room temperature. Solids are dissolved in 300 ml. of water and a solution of 15 g. potassium bromide in 50 ml. of water is added. Filtration and drying gives 5 - methylisoindolo(2,1-a)benzimidazolium bromide, melting point 266–286°. It has the structure:

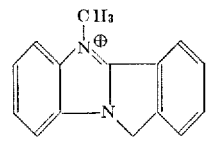

EXAMPLE 18

Preparation of methine cation by reaction of an aldehyde of type A with 5-methylisoindolo(2,1-a)benzimidazolium iodide A mixture of 0.35 g. 5-methylisoindolo(2,1-a)benzimidazolium iodide, prepared in accordance with the procedure of Example 3, 0.22 g. of 1,3,3-trimethyl-2-methylene-omega formylindoline (tribase aldehyde) and 10 ml. acetic anhydride is refluxed for 10 minutes, then held at 100° for ½ hour. Upon cooling to 25° C., the mixture is filtered, the solids are washed with cold ethanol and dried. There is obtained 0.3 g. of the cation which dyes modacrylic fibers bluish red and has the structure:

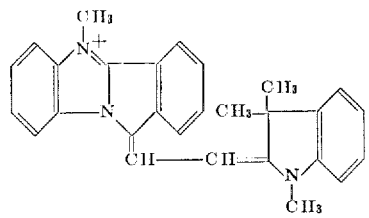

In accordance with the above procedure, the cations in Table II are prepared from type A aldehydes and 5-substituted isoindolo(2,1-a)benzimidazolium halides.

TABLE II

| Example No. | R¹ | R² | R³ | R⁵ | R⁶ |
|---|---|---|---|---|---|
| 19 | methyl | H | H | methyl | methyl |
| 20 | ethyl | H | 3-methyl | methyl | methyl |
| 21 | benzyl | 8-methyl | H | ethyl | ethyl |
| 22 | methyl | 8-methyl | 4-methyl | ethyl | ethyl |

EXAMPLE 23

Preparation of methine cation by reaction of an aldehyde of type B with 5-methylisoindolo(2,1-a)benzimidazolium iodide A mixture of 0.52 g. 5-methylisoindolo(2,1-a)benzimidazolium iodide, 0.33 g. 4-(N-ethyl-N-β-cyanoethyl)-2-methylbenzaldehyde and 25 ml. acetic anhydride is refluxed for 45 minutes, cooled to 25° C. and diluted with 50 ml. of diethyl ether. Solids are collected by filtration and washed with 20% potassium iodide solution. Drying gives 0.3 g. of the cation which dyes modacrylic fibers an orange-red shade and has the structure:

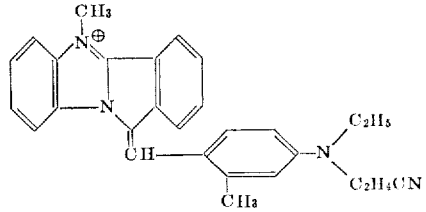

In accordance with the above procedure, the cations in Table III are prepared. The cations conform to Formula III in which X represents a type B aldehyde.

TABLE III

| Example | R¹ | R² | R³ | R⁷ | R⁷ | R⁸ | R¹⁰ |
|---|---|---|---|---|---|---|---|
| 24 | methyl | H | H | ethyl | | 2-Cl-ethyl | 2-methyl |
| 25 | methyl | 8-methyl | H | ethyl | | 2-CN-ethyl | 2-methyl |
| 26 | ethyl | H | 3-methyl | ethyl | | 2-CN-ethyl | 2-methyl |
| 27 | benzyl | 8-methyl | 4-methyl | 2-Cl-ethyl | | 2-CN-ethyl | 3-methyl |

TABLE V

| Example | R¹ | R² | R³ | R¹⁰ | R⁸ | R⁹ |
|---|---|---|---|---|---|---|
| 34 | methyl | H | H | methyl | 2-methyl | ethyl |
| 35 | methyl | 8-methyl | H | methyl | 2-methyl | 2-CN-ethyl |
| 36 | ethyl | H | 4-methyl | ethyl | 2-methyl | 2-CN-ethyl |
| 37 | benzyl | 8-methyl | 3-methyl | ethyl | 2-methyl | 2-Cl-ethyl |
| 38 | methyl | H | H | methyl | 2,2,4-trimethyl | 2-Cl-ethyl |

EXAMPLE 28

Preparation of methine cation by reaction of an aldehyde of type C with 5-methylisoindolo(2,1-a)benzimidazolium iodide A mixture of 0.52 g. 5-methylisodinolo(2,1-a)benzimidazolium iodide, 0.38 g. N-methyl-4'-ethoxy-4-formyldiphenylamine and 25 ml. of acetic anhydride is refluxed for 45 minutes, cooled to 25° C. and diluted with 50 ml. of diethyl ether. Filtration, ether washing and drying gives 0.3 g. of the dye which imparts a red shade to modacrylic fibers and has the structure:

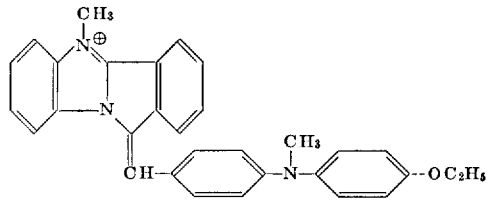

The cations in Table IV are prepared in accordance with the procedure described in Example 28 and conform to Formula III in which X represents the residue of a type C aldehyde.

The cations of Table V are prepared according to the procedure described in Example 33.

EXAMPLE 39

Preparation of methine cation by reaction of an aldehyde of type E with 5 - methylisoindole(2,1 - a)benzimidazolium iodide A mixture of 0.7 9. 5-methylisoindolo(2,1-a)benzimidazolium iodide, 0.35 g. p-dimethylaminocinnamaldehyde and 40 ml. acetic anhydride is refluxed for 1.5 hours, cooled to 10° C. and filtered. Solids are washed first with acetic acid, then with n-hexane and dried. 0.42 g. of the cation is obtained which dyes modacrylic fibers a violet shade and has the structure:

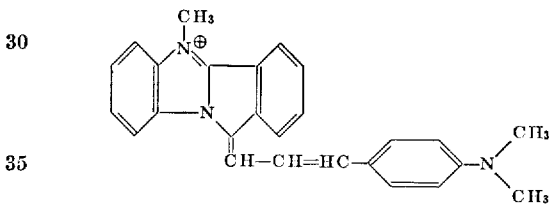

The cations of Table VI are prepared as described in Example 39.

TABLE VI

| Example | R¹ | R² | R³ | R⁷ | R⁸ | R¹⁰ |
|---|---|---|---|---|---|---|
| 40 | methyl | H | H | ethyl | 2-Cl-ethyl | 2-methyl |
| 41 | methyl | H | H | ethyl | 2-Cl-ethyl | 2-methyl |
| 42 | ethyl | H | methyl | ethyl | 2-CN-ethyl | 3-methyl |
| 43 | benzyl | methyl | H | 2-Cl-ethyl | 2-CN-ethyl | 2-methyl |

TABLE IV

| Ex. | R¹ | R² | R³ | R⁵ | R¹⁰ | R¹¹ |
|---|---|---|---|---|---|---|
| 29 | methyl | H | H | methyl | H | H |
| 30 | methyl | 8-methyl | H | methyl | 4'-ethoxy | H |
| 31 | ethyl | H | 4-methyl | ethyl | 4'-methoxy | H |
| 32 | benzyl | 8-methyl | 3-methyl | ethyl | 4'-ethoxy | H |

EXAMPLE 33

Preparation of methine cation by reaction of an aldehyde of type D with 5 - methylisoindolo(2,1 - a)benzimidazolium iodide A mixture of 0.52 g. 5 - methylisoindolo(2,1-a)benzimidazolium iodide, 0.36 g. 2,7-dimethyl-N-cyanoethyl-6-formyl-1,2,3,4-tetrahydroquinoline and 40 ml. acetic anhydride is refluxed for 1 hour, cooled and diluted with 75 ml. of ether. Filtration, washing with dilute potassium iodide solution and drying gives 0.3 g. of a cation which dyes modacrylic fibers red and has the structure:

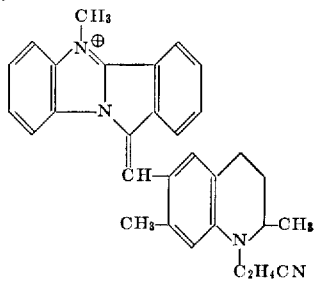

EXAMPLE 44

Benzo(3,4)pyrrolo(1,2-a)perimidinium hydrochloride

A mixture of 15.8 g. of 1,8-naphthalenediamine, 11 ml. of concentrated hydrochloric acid and 75 ml. ethanol is stirred for 5 minutes and evaporated to dryness to give 1,8-naphthalenediamine hydrochloride. The 1,8-naphthalenediamine hydrochloride is mixed with 14.3 g. of phthalide and the mixture is heated at 205° C. for 15 minutes. Upon cooling, the mixture is recrystallized from 800 ml. of ethanol to give benzo(3,4)pyrrolo(1,2-a)-perimidinium hydrochloride.

EXAMPLE 45

Benzo(3,4)pyrrolo(1,2-a)perimidine

The hydrochloride salt from Example 44 is dissolved in 600 ml. of hot, 50% aqueous ethanol and concentrated ammonium hydroxide is added until the solution becomes basic. Filtration at 30° C. and drying give 16.0 g. of the olive-colored benzo(3,4)-pyrrolo(1,2-a)perimidine. It has the structure:

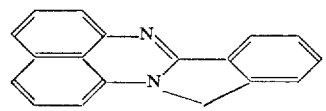

EXAMPLE 46

7-methyl-benzo(3,4)pyrrolo(1,2-a)perimidinium bromide

A mixture of 5.12 g. of benzopyrroloperimidine and 15 ml. dimethyl sulfate is heated at 150° C. for 0.5 hours, cooled and mixed with 200 ml. diethyl ether. The solids are separated, washed with ether, and dissolved in 300 ml. of hot water. After filtration, a solution of 10 g. potassium bromide in 40 ml. water is added. Filtration at 25° C. and drying gives the orange solid, 7-methyl-benzo (3,4)pyrrolo(1,2-a)perimidinium bromide. It has the structure:

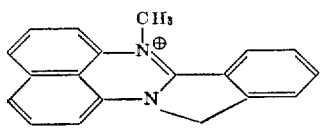

In accordance with the procedure described in Example 46, the 7-substituted benzo(3,4)pyrrolo(1,2-a)perimidines of Table VII are prepared.

TABLE VII

| Example: | $R^1$ | $R^2$ | $R^4$ | $R^3$ |
|---|---|---|---|---|
| 47 | methyl | H | 2-methyl | 10-methyl |
| 48 | methyl | 4-methyl | 2-methyl | H |
| 49 | methyl | H | H | 9-methyl |
| 50 | methyl | H | 2-methyl | methoxy |
| 51 | benzyl | 4-methyl | 3-methyl | H |
| 52 | methyl | 6-methyl | 3-methyl | 8-methyl |

EXAMPLE 53

Preparation of methine cation by reaction of an aldehyde of type A with 7-methyl-benzo(3,4)pyrrolo(1,2-a)perimidinium bromide A mixture of 0.35 g. 1,3,3 - trimethyl - 2 - methylene-omega-formylidinoline, 0.53 g. 7 - methyl-benzo(3,4) pyrrolo(1,2-a)perimidinium bromide and 8 ml. of acetic anhydride is refluxed for 1 hour, cooled to 300° C., and mixed with 100 ml. of diethyl ether. Solids are filtered off, ether washed and slurried in 100 ml. of 2% potassium bromide. Filtration and drying gives a blue cation which dyes modacrylic fibers blue and has the structure:

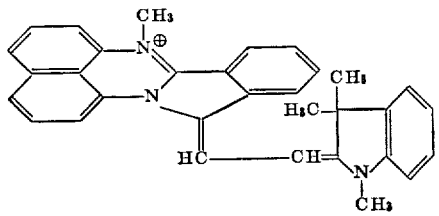

The cations described in Table VIII are prepared in accordance with the procedure of Example 53 and conform to Formula IV in which $R^2$, $R^3$ and $R^4$ are hydrogen and X is the residue of a type A aldehyde.

TABLE VIII

| Example: | $R^1$ | $R^5$ | $R^6$ |
|---|---|---|---|
| 54 | methyl | methyl | Cl-ethyl |
| 55 | ethyl | methyl | CN-ethyl |
| 56 | ethyl | methyl | methyl |
| 57 | benzyl | methyl | methyl |

EXAMPLE 58

Preparation of methine cation by reaction of an aldehyde of type B with 7-methyl-benzo(3,4)pyrrolo(1,2-a)perimidinium bromide A mixture of 0.53 g. 7 - methyl - benzo(3,4)pyrrolo (1,2-a) - perimidinium bromide, 0.38 g. 4-(N - ethyl-N-β-cyanoethyl) - 2-methylbenzaldehyde and 8 ml. acetic anhydride is refluxed for 2 hours, cooled to 30° C., and mixed with 300 ml. of ether. Solids are filtered, washed with ether, and slurried in 100 ml. of 2% potassium bromide. Filtration, water washing, and drying gives 0.7 g. of a cation that dyes modacrylic fibers blue. It has the structure:

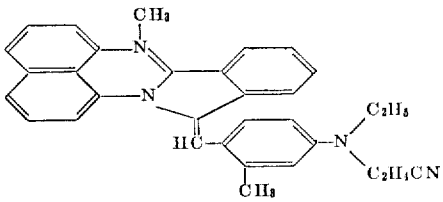

The cations set forth in Table 9 are prepared as described in Example 57 and have the general Formula IV in which $R^2$, $R^3$ and $R^4$ are hydrogen and X is the residue of a type B aldehyde.

TABLE IX

| Ex. | $R^1$ | $R^7$ | $R^8$ | $R^{10}$ |
|---|---|---|---|---|
| 59 | methyl | 2-Cl-ethyl | ethyl | 2-methyl |
| 60 | methyl | 2-methoxyethyl | ethyl | 2-methyl |
| 61 | methyl | 2-Cl-ethyl | Cl-ethyl | 3-methyl |
| 62 | ethyl | 2-CN-ethyl | ethyl | 3-methyl |
| 63 | ethyl | 2-CN-ethyl | n-propyl | H |
| 64 | ethyl | 2-CN-ethyl | ethyl | 2-methyl |
| 65 | ethyl | 2-Br-ethyl | ethyl | 2-methyl |
| 66 | benzyl | 2-CN-ethyl | ethyl | 2-methyl |
| 67 | benzyl | 2-Cl-ethyl | ethyl | 2-ethyl |
| 68 | benzyl | 2-Cl-ethyl | ethyl | 2-methy |
| 69 | benzyl | 2-succinimidoethyl | ethyl | 2-methy |

EXAMPLE 70

Preparation of methine cation by reaction of an aldehyde of type C with 7-methyl-benzo(3,4)pyrrolo(1,2-a)perimidinium bromide A mixture of 0.38 g. N-methyl-4'-ethoxy-4-formyldiphenylamine, 0.53 g. 7-methyl-benzo(3,4)pyrrolo(1,2-a) perimidinium bromide, and 10 ml. acetic anhydride is refluxed for 1 hour, cooled to 25° C., diluted with 50 ml. of ether, and filtered. The solids are washed with cold ethanol and then with 10% aqueous potassium bromide solution. Water washing and drying gives 0.6 g. of the cation which dyes modacrylic fibers violet and has the structure:

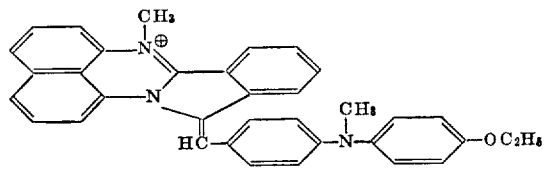

The cations in the following table are prepared as described in Example 69 and conform to Formula IV wherein $R^2$, $R^3$ and $R^4$ are hydrogen and X represents the residue of a type C aldehyde.

TABLE X

| Example: | $R^1$ | $R^8$ | $R^{10}$ | $R^{11}$ |
|---|---|---|---|---|
| 71 | methyl | methyl | H | 2-methyl |
| 72 | methyl | ethyl | H | 2-methyl |
| 73 | ethyl | 2-Cl-ethyl | 4'-methoxy | 2-methyl |
| 74 | benzyl | 2-CN-ethyl | 4'-methoxy | 2-methyl |
| 75 | methyl | 2-Cl-ethyl | H | H |
| 76 | methyl | methyl | H | 2-methyl |
| 77 | methyl | methyl | 4'-methoxy | H |
| 78 | methyl | ethyl | 4'-methyl | H |

EXAMPLE 79

Preparation of methine cation by reaction by type D aldehyde with 7 - methyl - benzo(3,4)pyrrolo(1,2-a)perimidinium bromide A mixture of 0.53 g. 7-methyl-benzo(3,4)pyrrolo(1,2-a)perimidinium bromide, 0.36 g. 2,7-dimethyl-N-cyanoethyl-6-formyl - 1,2,3,4 - tetrahydroquinoline and 10 ml. acetic anhydride is refluxed for 1 hour, cooled to 25° C. and mixed with 50 ml. of diethyl ether. Solids are filtered off, washed with ether and then washed with 10% aqueous potassium bromide. Water washing and drying gives 0.6 g. of a cation which dyes modacrylic fibers violet. It has the structure:

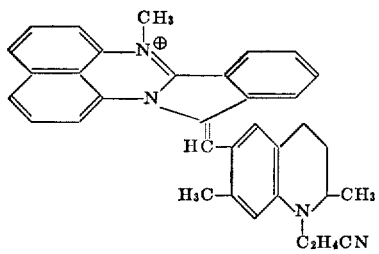

In accordance with the procedure of Example 78, the following cations are prepared:

TABLE XI

| Example: | R¹ | R¹⁰ | R⁸ | R⁹ |
|---|---|---|---|---|
| 80 | methyl | methyl | 2-methyl | ethyl |
| 81 | methyl | methyl | 2-methyl | 2-Cl-ethyl |
| 82 | ethyl | methyl | 2-methyl | ethyl |
| 83 | ethyl | methyl | 2,2,4-trimethyl | 2-CN-ethyl |
| 84 | ethyl | methyl | 2,2,4-trimethyl | 2-Cl-ethyl |
| 85 | methyl | methyl | 2-methyl | 2-CN-ethyl |
| 86 | benzyl | methyl | 2-methyl | ethyl |
| 87 | methyl | methyl | 2-methyl | 2-Cl-ethyl |

EXAMPLE 88

Preparation of methine cation by reaction of an aldehyde of type E with 7 - methyl - benzo(3,4)pyrrolo(1,2-a)perimidinium A mixture of 0.7 g. 7-methyl-benzo(3,4)pyrrolo(1,2-a)perimidinium bromide, 0.35 g. p-dimethylaminocinnamaldehyde, and 8 ml. acetic anhydride is refluxed for 1 hour. Upon cooling to 25° C. solids are filtered and clurried in 100 ml. of 5% aqueous potassium bromide. Filtration, water washing, and drying gives 0.65 g. of the cation which imparts a blue shade to modacrylic fibers. It has the structure:

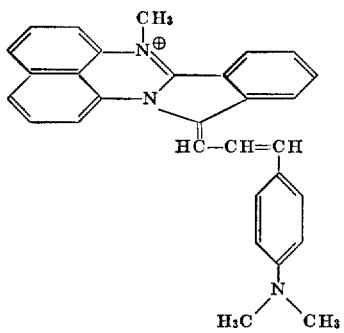

The cations in the following table are prepared in accordance with the procedure described in Example 87 and conform to general Formula IV in which R², R³ and R⁴ are hydrogen and X represents a residue of a type E aldehyde.

TABLE XII

| Example: | R¹ | R⁷ | R⁸ | R¹⁰ |
|---|---|---|---|---|
| 89 | methyl | ethyl | 2-CN-ethyl | 2-methyl |
| 90 | methyl | ethyl | 2-CN-ethyl | 2-methyl |
| 91 | methyl | 2-Cl-ethyl | 2-Cl-ethyl | 2-methyl |
| 92 | benzyl | 2-CN-ethyl | 2-Cl-ethyl | 2-methyl |
| 93 | benzyl | ethyl | ethyl | 3-methyl |
| 94 | benzyl | 2-CN-ethyl | ethyl | 2-methyl |
| 95 | methyl | ethyl | ethyl | 2-ethyl |

The methine cations of the invention can be used, as described above, for dyeing acrylic and modacrylic polymer fibers, yarns and fabrics giving shapes of orange to blue when applied thereto by conventional dye methods. Acrylic textile materials are those which consist of at least 85% acrylonitrile and modacrylic textile materials are those consisting of at least 35% but less than 85% acrylonitrile. The compounds of the invention also give excellent dyeings on acid-modified acrylic textile materials such as the sulfonate modified acrylic fibers described in U.S. Pats. 2,837,500, 2,837,501 and 3,043,811. The novel compounds and cations can also be used to dye sulfonate modified polyester fibers such as are described in U.S. Pat. 3,018,272. Examples of the textile materials that are dyed with the compounds and cations of the invention are those sold under the trade names "Orlon," "Orlon 42," "Verel," "Acrilan," "Dynel," "Creslan" and "Dacron 64."

Textile materials dyed by the cations of the invention are characterized by containing at least about 35% combined acrylonitrile units and up to about 95% acrylonitrile units, and modified, for example, by 65–5% of vinyl pyridine units as described in U.S. Pats. 2,990,393 (Re. 25,533) and 3,014,008 (Re. 25,539) or modified by 65–5% of vinylpyrrolidone units, for example, as described by U.S. Pat. 2,970,783, or modified with 65–5% acrylic ester or acrylamide units as described in U.S. Pats. 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

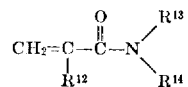

wherein R¹² is selected from the group consisting of hydrogen and methyl, and R¹³ and R¹⁴ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the cations of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein R¹², R¹³, R¹⁴ are as described above. Specific polymers of that type contains 70–95% by weight of (A) a copolymer of from 30–65% by weight of vinylidene chloride and 70–35% by weight of acrylonitrile and (B) 30–5% by weight of a lower N-alkylacrlyamide polymer such as poly-N-methacrylamide, poly-N-isopropylacrylamide and poly-N-tertiarybutylacrylamide.

The following example illustrates one way in which the methine cations of the invention can be used to dye acrylonitrile polymer textile material.

EXAMPLE 96

An amount of 0.1 gram of dye is dissolved by warming in 5 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile materials, the dyeing is carried out at the boil for one hour. In the case of materials made of "Verel" modacrylic fiber the dyebath temperature should not exceed 90° C. in order to avoid damage to the fiber. The dye material in then washed well with water and dried.

The invention has been described in considerable detail with particularly reference to certain preferred embodiments thereof, but it will be understood that variations and modifications can be effected within the spirit and scope of the invention as described hereinabove and as defined in the appended claims.

I claim:

1. A compound having one of the following formulas:

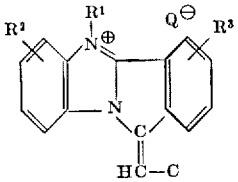

or

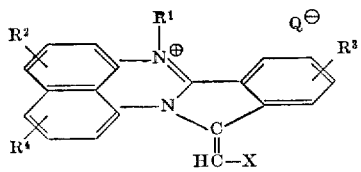

wherein
Q represents an acid anion;
$R^1$ represents a lower alkyl group or a benzyl group;
$R^2$, $R^3$ and $R^4$ are the same or different and each represents hydrogen, an alkyl group or an alkoxy group; and
X represents an aldehyde residue selected from the group consisting of

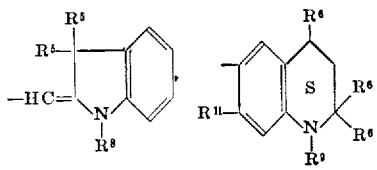

and

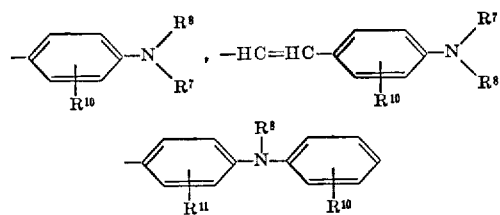

wherein
$R^5$ represents lower alkyl;
$R^6$ represents hydrogen or lower alkyl;
$R^7$, $R^8$ and $R^9$ are the same or different and each represents hydrogen, lower alkyl, or lower alkyl substituted with lower alkoxy, cyano, lower carboxylic acid imido, or halogen; and
$R^{10}$ and $R^{11}$ are the same or different and each represents hydrogen, lower alkyl, lower alkoxy or halogen.

2. A cation as defined in claim 1 wherein $R^1$ represents methyl or benzyl;
$R^2$ and $R^3$ represent hydrogen, methyl or methoxy.

3. A compound as defined in claim 1 having the formula

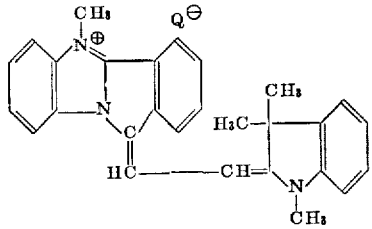

wherein Q represents an acid anion.

4. A compound as defined in claim 1 having the formula

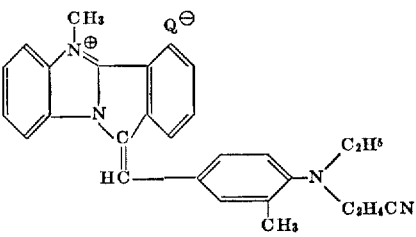

wherein Q represents an acid anion.

5. A compound as defined in claim 1 having the formula

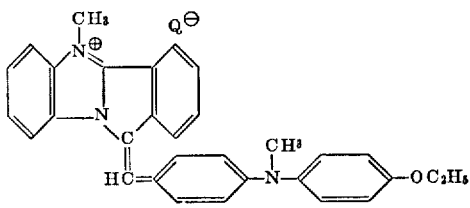

wherein Q represents an acid anion.

6. A compound as defined in claim 1 having the formula

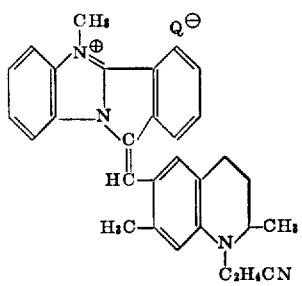

wherein Q represents an acid anion.

7. A compound as defined in claim 1 having the formula

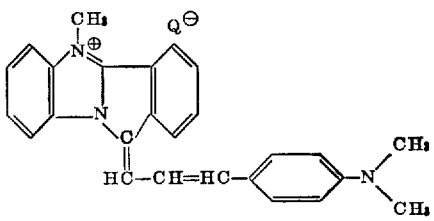

wherein Q represents an acid anion.

8. A compound as defined in claim 1 having the formula

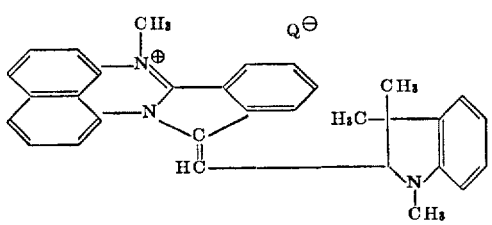

wherein Q represents an acid anion.

9. A compound as defined in claim 1 having the formula

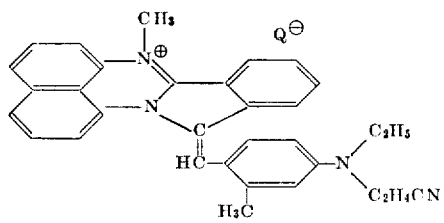

wherein Q represents an acid anion.

10. A compound as defined in claim 1 having the formula

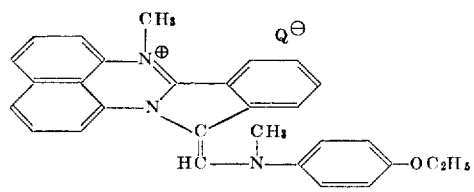

wherein Q represents an acid anion.

11. A compound as defined in claim 1 having the formula

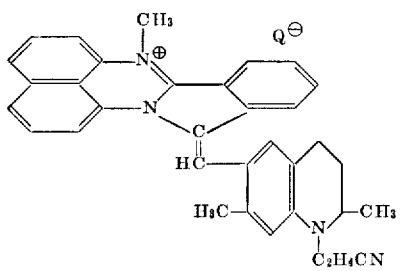

wherein Q represents an acid anion.

12. A compound as defined in claim 1 having the formula

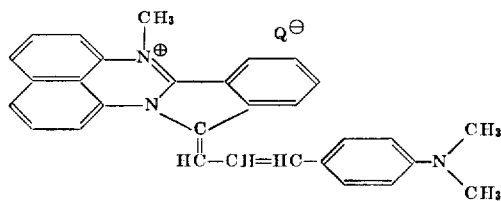

wherein Q represents an acid anion.

13. A compound having the following formula

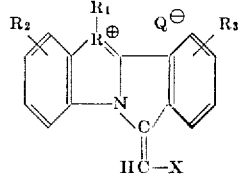

wherein
  Q represents an acid anion;
  $R^1$ represents a lower alkyl group or a benzyl group;
  $R^2 + R^3$ are the same or different and each represents hydrogen, an alkyl group or an alkoxy group; and
  X represents an aldehyde residue selected from the group consisting of

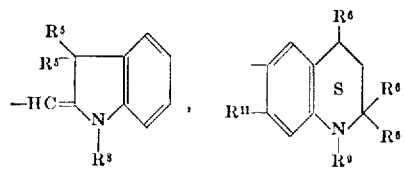

and

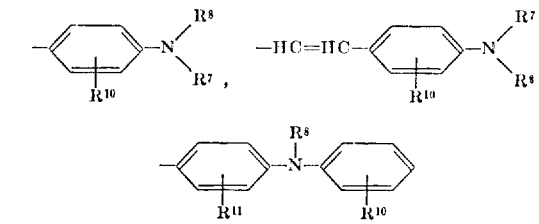

wherein
  $R^5$ represents lower alkyl;
  $R^6$ represents hydrogen or lower alkyl;
  $R^7$, $R^8$ and $R^9$ are the same or different and each represents hydrogen, lower alkyl, or lower alkyl substituted with loyer alkoxy, cyano, lower carboxylic acide imido, or halogen; and
  $R^{10}$ and $R^{11}$ are the same or different and each represents hydrogen, lower alkyl, lower alkoxy or halogen.

References Cited

UNITED STATES PATENTS 3,243,298   3/1966   Libeer et al. _____ 96—105

OTHER REFERENCES

Thiele et al., Annalen Der Chemie, vol. 347, pages 115 and 125 to 126 (1906).

Sparatore et al., Gazz. Chim. Ital. vol. 92, page 611 (1962).

JOHN D. RANDOLPH, Primary Examiner

U.S. Cl. X.R.

8—55; 260—240.7, 240.9, 289, 309.2, 326.11, 343.3, 465, 576, 577, 578.